(12) United States Patent
Romeo

(10) Patent No.: US 10,960,461 B2
(45) Date of Patent: Mar. 30, 2021

(54) CONTINUOUS LEAD STRIP CASTING LINE, CASTER, AND NOZZLE

(71) Applicant: Wirtz Manufacturing Company, Inc., Port Huron, MI (US)

(72) Inventor: Michael Romeo, St. Clair, MI (US)

(73) Assignee: Wirtz Manufacturing Co., Inc., Port Huron, MI (US)

(*) Notice: Subject to any disclaimer, the term of this patent is extended or adjusted under 35 U.S.C. 154(b) by 411 days.

(21) Appl. No.: 15/703,330

(22) Filed: Sep. 13, 2017

(65) Prior Publication Data

US 2018/0071816 A1 Mar. 15, 2018

Related U.S. Application Data

(60) Provisional application No. 62/394,561, filed on Sep. 14, 2016.

(51) Int. Cl.

| B22D 11/06 | (2006.01) |
|---|---|
| B22D 11/00 | (2006.01) |
| H01M 4/16 | (2006.01) |
| H01M 4/22 | (2006.01) |
| H01M 4/73 | (2006.01) |
| H01M 10/12 | (2006.01) |

(52) U.S. Cl.
CPC ........ B22D 11/0642 (2013.01); B22D 11/004 (2013.01); B22D 11/0622 (2013.01); B22D 11/0682 (2013.01); H01M 4/16 (2013.01); H01M 4/22 (2013.01); H01M 4/73 (2013.01); H01M 10/12 (2013.01); Y02T 10/70 (2013.01)

(58) Field of Classification Search
CPC ....... B22D 11/00; B22D 11/004; B22D 11/06; B22D 11/0622; B22D 11/0642; B22D 11/0682; H01M 4/16; H01M 4/22; H01M 4/73; H01M 10/12
USPC ................................................. 164/428, 437
See application file for complete search history.

(56) References Cited

U.S. PATENT DOCUMENTS

| 3,765,817 A | 10/1973 | Ancker |
|---|---|---|
| 4,050,502 A | 9/1977 | Allyn et al. |

(Continued)

FOREIGN PATENT DOCUMENTS

| CN | 101786145 A | 7/2010 |
|---|---|---|
| DE | 103 02 382 A1 | 9/2004 |

(Continued)

OTHER PUBLICATIONS

EPO App. 17 191 213.2-1108; EPO Office Action dated Sep. 18, 2019.

(Continued)

*Primary Examiner* — Kevin P Kerns
(74) *Attorney, Agent, or Firm* — Reising Ethington P.C.

(57) ABSTRACT

In one embodiment, a lead strip caster for battery grids includes a ladle, a nozzle, and a pair of rollers. The lead strip caster produces a continuous lead strip for use as battery positive plate grids. The ladle has an inlet to receive molten lead and has an outlet. The nozzle has at least one passage that communicates with the outlet of the ladle in order to receive molten lead from the ladle. The first roller is situated at a first exterior side of the nozzle. The first roller rotates via a first driver. The second roller is situated at a second exterior side of the nozzle. The second roller rotates via a second driver.

20 Claims, 11 Drawing Sheets

(56) References Cited

U.S. PATENT DOCUMENTS

| | | | |
|---|---|---|---|
| 4,153,101 | A | 5/1979 | Chateau et al. |
| 5,467,805 | A | 11/1995 | Farina |
| 5,584,336 | A | 12/1996 | Romanowski et al. |
| 6,220,336 | B1 | 4/2001 | Smith |
| 6,363,999 | B1 | 4/2002 | Smith |
| 2013/0119094 | A1* | 5/2013 | Mahapatra et al. .......... 222/591 |

FOREIGN PATENT DOCUMENTS

| | | |
|---|---|---|
| EP | 0983129 B1 | 7/2002 |
| EP | 1056560 B1 | 4/2005 |
| EP | 1555074 A1 | 7/2005 |
| EP | 1539404 B1 | 11/2007 |
| EP | 1867412 A1 | 12/2007 |
| JP | S5576571 A | 6/1980 |
| JP | 2011189356 A | 9/2011 |
| KR | 20120074540 A | 7/2012 |
| WO | 97/09139 | 3/1997 |
| WO | 2014/056796 A1 | 4/2014 |

OTHER PUBLICATIONS

Extended European Search Report and Search Opinion in EP 17191213.2-1108 dated Feb. 20, 2018, 7 pages.

"Particle Dispersion in Aluminum and Magnesium Alloys", Xinliang Yang, BCSAT, Brunel Uni London, Jul. 2016; pp. I-VIII +pp. 1-137 (Metal Matrix Composites, twin roll casting of Al & Mg Alloys).

"Twin roll casting of Mg alloys with high Al contents", by Hisaki Watari et al., Journal of Achievements in Materials and Manufacturing Engineering, vol. 18, Sep.-Oct. 2006.

"Microdefects formation during the twin-roll casting of Al—Mg—Mn aluminum alloys", by Ch. Gras et al., Journal of Materials Processing Technology, vol. 167, published in 2005.

"Effect of casting parameters on roll separation force during twin roll casting", by Yun-Soo Lee et al., 11th International Conference on Technology of Plasticity, published in 2014.

"Fabrication of High Aluminum Content Mg alloys using a Horizontal Twin Roll Caster", by Hideto Harada et al., World Academy of Science, Engineering & Technology, vol. 63, 2012.

"Continuous roll casting of Aluminum alloys—Casting parameters analysis", by E. Krstic Vukelja et al., Metalurgija, vol. 49, published in 2010.

"Strip casting technology . . . a key to product quality", by Pierre-Yves Menet et al., International Melt Quality Workshop, published in Oct. 2001.

"Survey of inclusions in twin roll casting of wrought aluminum alloys", by Yucel Birol, International Journal of Cast Metals Research, vol. 23, 2010.

* cited by examiner

CONTINUOUS LEAD STRIP CASTING LINE, CASTER, AND NOZZLE

REFERENCE TO CO-PENDING APPLICATION

This application claims priority to U.S. Provisional Application No. 62/394,561 filed Sep. 14, 2016, which is incorporated herein by reference in its entirety.

TECHNICAL FIELD

This disclosure relates generally to lead-acid battery manufacturing equipment, and more particularly to continuous lead strip casting lines, casters, and nozzles for battery plate grids.

BACKGROUND

Lead-acid batteries are a common energy storage device, and are often used in the automotive industry, marine industry, motive power industry, renewable energy industry, and uninterruptable power supply industry, as well as other applications. Among other components, lead-acid batteries include positive and negative plates that are installed in its interior and are made of lead or lead alloy grids with an electrochemically active battery paste material applied on the grids. The grids are commonly designed to have intersecting wires defining open spaces to receive the battery paste material.

Manufacturing grids for use as positive plates requires a certain amount of care, as the positive plates will ultimately include active material in the form of lead dioxide ($PbO_2$) when charged and lead sulfate ($PbSO_4$) when discharged. Unlike negative plates, the half-cell potential of the positive plates exists within a range where the positive plate grids can become oxidized during normal operation, which can result in corrosion on the grids and ultimate degradation of battery performance and even battery failure. As such, the positive plate grids are manufactured in specific processes that yield a grain structure resistant to corrosion. The positive plate grids are typically produced by gravity casting, which can be a slow and laborious process, or by a continuous casting and rolling process that involves a casting machine that turns molten lead into a hardened elongate continuous strip that is subsequently punched into individual grids connected together.

Conventional casting machines draw molten lead from an open pool that is exposed to one or more casting surfaces of one or more rollers. Lead impurities, along with dross that develops from the oxidation of alloy materials exposed to the atmosphere, residing at a top surface of the molten lead pool can be drawn into the cast strip during the process. The impurities can result in deformations and defects in the hardened strip of grids that are often magnified and intensified amid rolling. The deformations and defects, if present in the grid wires, can ultimately degrade battery performance and shorten the battery's useful life.

SUMMARY

One embodiment of a lead strip caster for battery plate grids may include a ladle, a nozzle, a first roller, and a second roller. The ladle may have an inlet to receive molten lead and may have an outlet. The nozzle may have a passage that communicates with the outlet of the ladle in order to receive molten lead from the ladle. The first roller may be situated at a first exterior side of the nozzle. The first roller may rotate via a first driver, and may have a first outer surface. The second roller may be situated at a second exterior side of the nozzle. The second roller may rotate via a second driver, and may have a second outer surface. During use of the lead strip caster, molten lead exiting the passage of the nozzle may come into contact with the first outer surface of the first roller and may come into contact with the second outer surface of the second roller. The molten lead may progressively harden as it moves downstream of the passage.

One embodiment of a lead strip caster nozzle may include a first passage receiving molten lead, a second passage receiving molten lead, a first exterior working surface, and a second exterior working surface. The first exterior working surface may confront a first roller outer surface. The second exterior working surface may confront a second roller outer surface. During use of the lead strip caster nozzle, molten lead exiting the first passage may be delivered to the first exterior working surface, and molten lead exiting the second passage may be delivered to the second exterior working surface.

One embodiment of a lead strip caster for battery plate grids may include a nozzle, a first roller, and a second roller. The nozzle may have a first passage, a second passage, a first exterior working surface, and a second exterior working surface. The first roller may have a first outer surface that confronts the first exterior working surface in assembly. The second roller may have a second outer surface that confronts the second exterior working surface in assembly. During use of the lead strip caster, molten lead exiting the first passage is delivered to the first exterior working surface and comes into contact with the first outer surface, and molten lead exiting the second passage is delivered to the second exterior working surface and comes into contact with the second outer surface.

BRIEF DESCRIPTION OF THE DRAWINGS

Objects, features, and advantages of the present disclosure will be apparent from the following detailed description of exemplary embodiments and best mode, appended claims, and accompanying drawings in which:

DETAILED DESCRIPTION

Referring in more detail to the drawings, a lead strip caster 10 is designed and constructed to produce a continuous lead strip more effectively and more efficiently than previously possible. The continuous lead strip produced by the lead strip caster 10 is intended for use as battery positive plate grids and can be subsequently punched and processed therefor. Among many potential advancements, the lead strip caster 10 possesses a smaller overall machine footprint to satisfy floor space demands; impurities and dross residing in molten lead pools are precluded from making their way into the produced lead strip; molten lead flow and movement is more effectively controlled as it travels through the lead strip caster 10; and adjustments to strip width and strip thickness are more readily made. The lead strip caster 10 can be used in larger processes that manufacture lead-acid batteries for cars, trucks, hybrid vehicles, motorcycles, boats, snowmobiles, golf carts, consumer equipment such as powered wheelchairs, industrial equipment such as forklifts and robots, and for other applications. As an aside, and as used herein, the term downstream generally refers to a direction that is with the flow of molten lead as it moves through the lead strip caster 10, the term upstream generally refers to a direction that is against the flow of molten lead as it moves through the lead strip caster 10, the terms horizontal and vertical are used with general reference to the ground surface upon which the lead strip caster 10 is stationed for operation, and the term lead refers to both lead and lead alloy materials.

Figure 1:
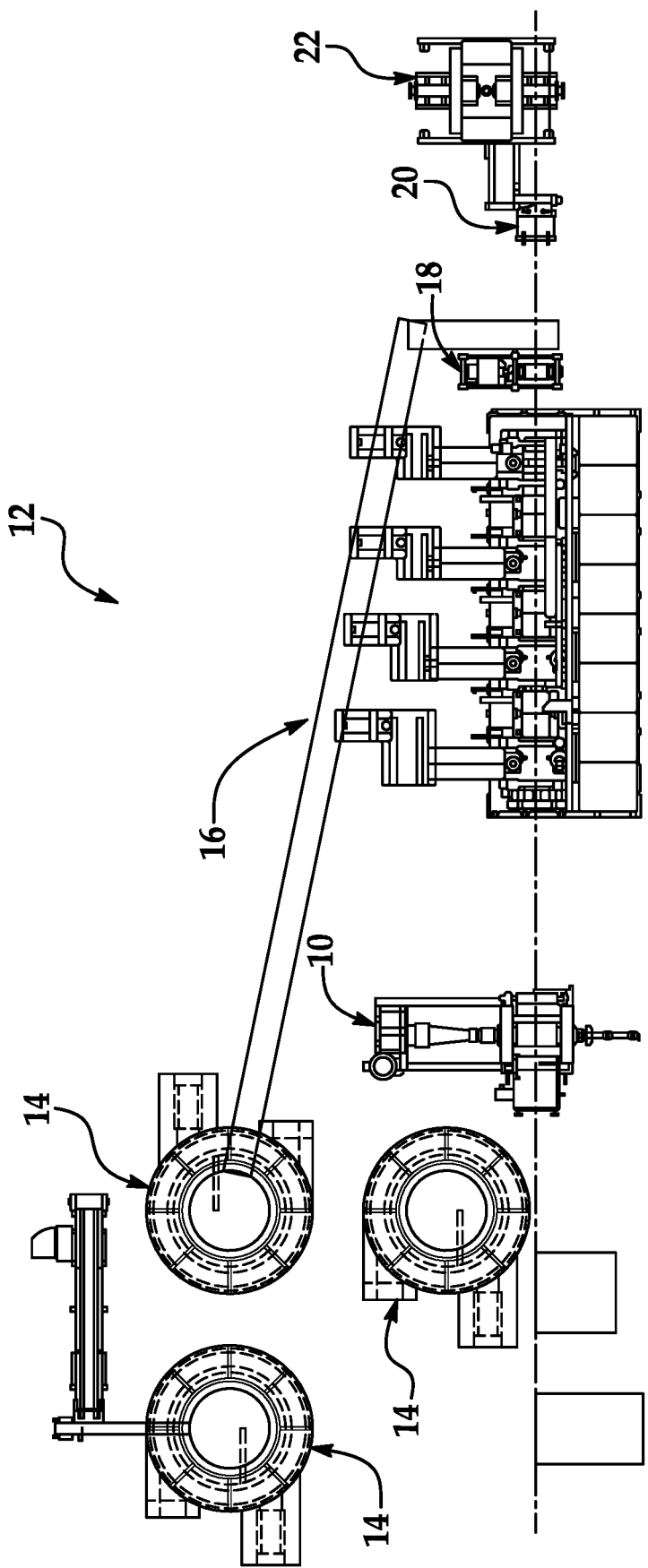
FIG. 1 is a schematic depiction of an embodiment of a continuous lead strip casting line.

In general, the lead strip caster 10 is but one piece of equipment employed in a larger process to produce continuous lead strips. Referring to FIG. 1, a continuous lead strip casting production line 12 can also be equipped with furnaces 14, a set of rolling mills 16, an edge trim cutter 18, a tensioner 20, and a reeler 22, as well as other components. The continuous lead strip casting production line 12 of FIG. 1 is but one embodiment, and other embodiments of continuous lead strip casting production lines could include more, less, and/or different equipment than depicted and described. Additional processes downstream of the continuous lead strip casting production line 12 may include punching, pasting, cutting, drying, curing, and/or forming.

Figure 2:
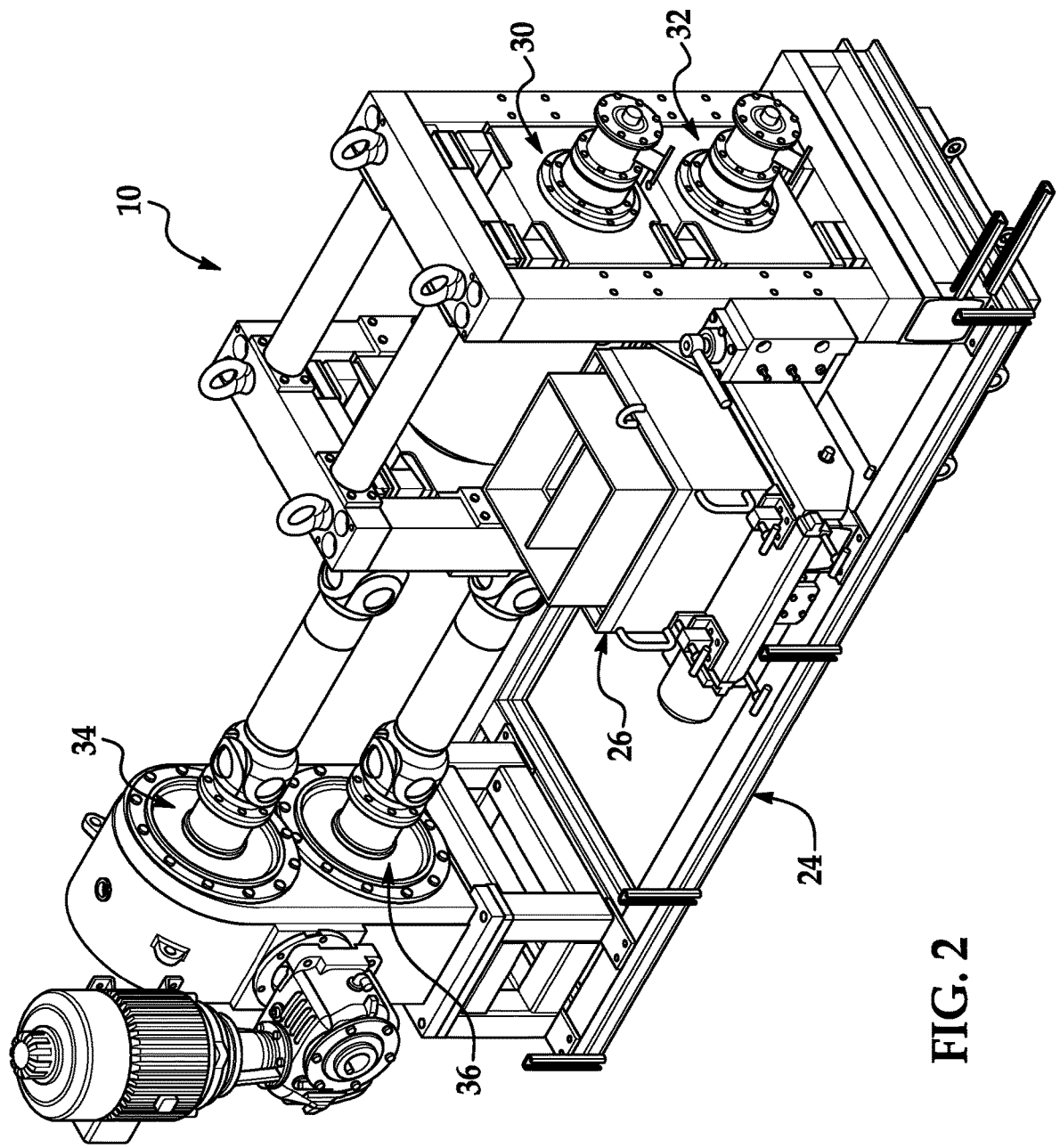
FIG. 2 is a perspective view of an embodiment of a lead strip caster for battery plate grids.

The lead strip caster 10 receives molten lead fed from the furnaces 14, and transforms the molten lead into a hardened continuous lead strip that is advanced to the set of rolling mills 16 for further processing. At this stage in the process, the continuous lead strip has yet to be imparted with intersecting wires and open spaces. The lead strip caster 10 can have various designs, constructions, and components in different embodiments depending upon—among other considerations—the desired size of the produced continuous lead strip, the desired run rate of the continuous lead strip through the continuous lead strip casting production line 12, and preceding and subsequent steps in the larger production process. In the embodiment depicted in FIG. 2, the lead strip caster 10 includes a frame 24, a ladle 26, a nozzle 28 (FIGS. 6-10), a first roller 30, a second roller 32, a first driver 34, and a second driver 36. The frame 24 provides a structural skeleton for the lead strip caster 10 and supports other components of the lead strip caster 10. The frame 24 can be made up of many vertical, side, and cross members of steel that are joined together.

Figure 3:
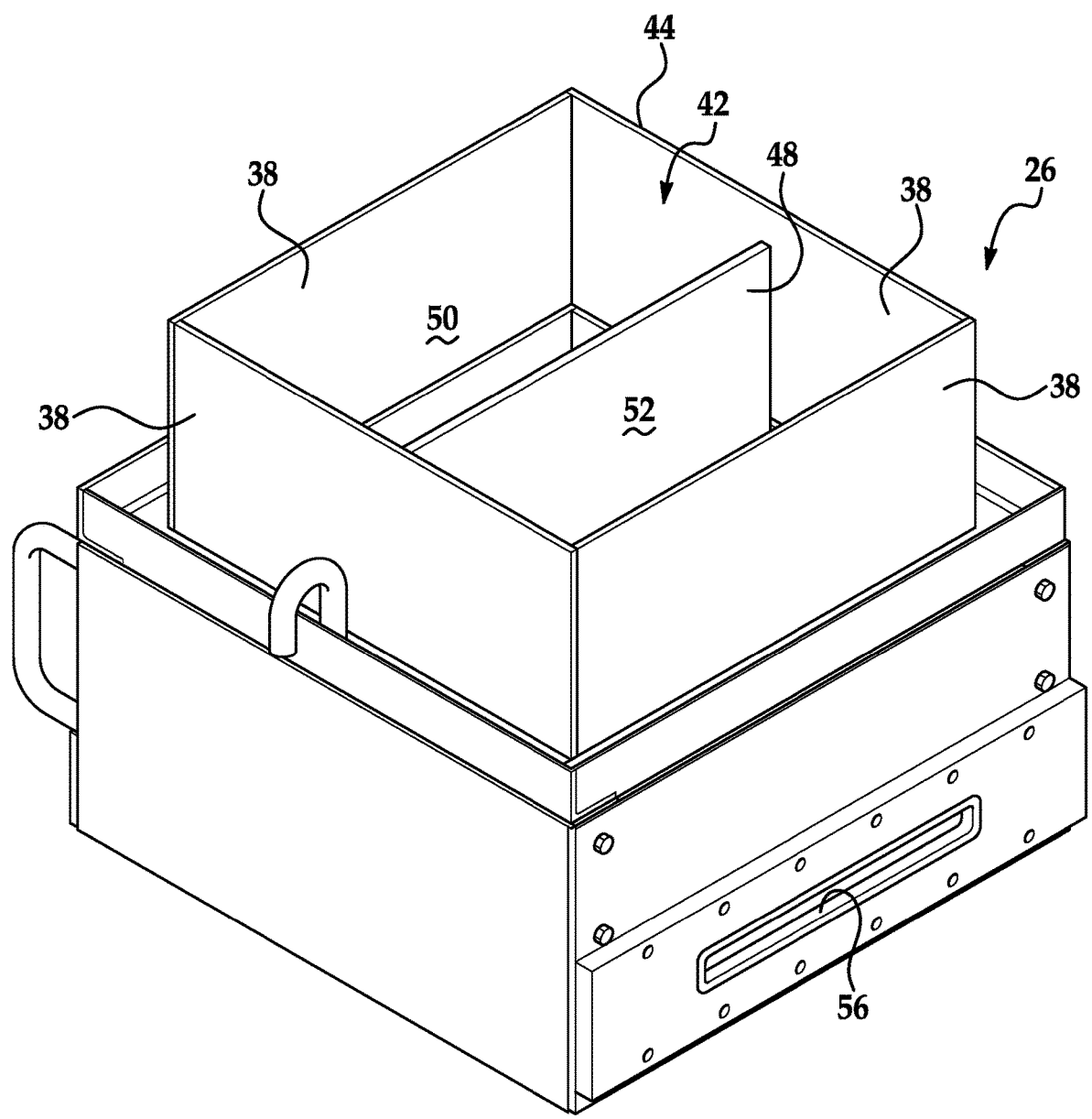
FIG. 3 is perspective view of an embodiment of a ladle of the lead strip caster.
Figure 4:
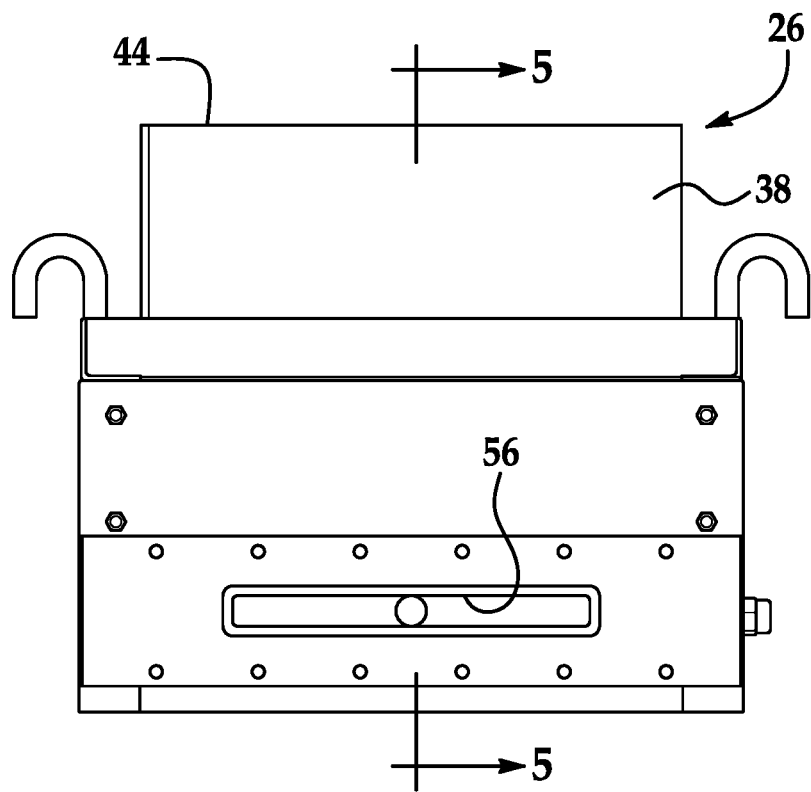
FIG. 4 is a front view of the ladle.
Figure 5:
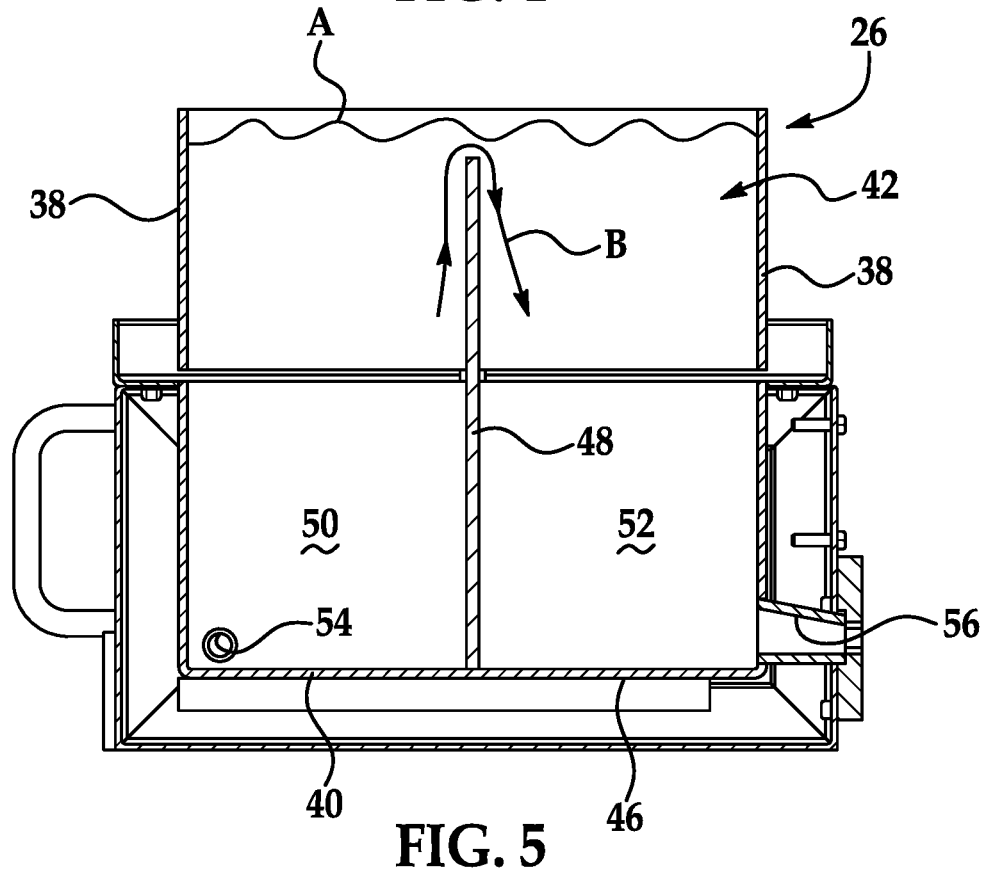
FIG. 5 is sectional view of the ladle.

Referring to FIGS. 3-5, the ladle 26 receives molten lead fed and supplied to it from the furnaces 14, and provisionally holds the molten lead in a pool A as the molten lead continues on to the nozzle 28. With respect to the flow and movement of the molten lead, the ladle 26 is configured upstream of the nozzle 28. The ladle 26 can have various designs, constructions, and components in different embodiments. In the embodiment presented in FIGS. 3-5, the ladle 26 is constructed of four side walls 38 and a bottom wall 40 that together define an interior 42 to contain molten lead. The ladle 26 has an open top 44 and a closed bottom 46. The ladle 26 can, though need not, include a partition wall 48 located within the interior 42 and spanning from one side wall 38 across to another side wall 38, thereby dividing the interior 42 into a first interior compartment 50 and a second interior compartment 52. As molten lead makes its way through the interior 42 from the first interior compartment 50, over the partition wall 48, and to the second interior compartment 52 along a path B, degasification of the molten lead may occur. In this way, the partition wall 48 serves to retard the movement of the molten lead as the molten lead proceeds through the ladle 26. An inlet 54 of the ladle 26 serves as the entrance through which molten lead enters the interior 42 from the furnaces 14. The inlet 54 is located at a bottom section and bottom half of the ladle 26 and just above the bottom wall 40, as shown best in FIG. 5. Its location feeds molten lead from the inlet 54 directly to the first interior compartment 50. Furthermore, an outlet 56 of the ladle 26 serves as the exit through which molten lead leaves the interior 42 to the nozzle 28. Like the inlet 54, the outlet 56 is located at the bottom section and bottom half of the ladle 26 and just above the bottom wall 40, as shown in FIG. 5. Its location receives molten lead directly from the second interior compartment 52. As illustrated in FIGS. 3 and 4, the outlet 56 has a slot-like shape in order to accommodate and match a corresponding entrance of the nozzle 28.

Referring to FIGS. 6-9, the nozzle 28 receives molten lead from the ladle 26 and controls the flow and movement of the molten lead for downstream delivery to the first and second rollers 30, 32. With respect to the flow and movement of the molten lead, the nozzle 28 is configured downstream of the ladle 26. The nozzle 28 can have various designs, constructions, and components in different embodiments. In the embodiment presented in FIGS. 6-9, the nozzle 28 is made up of two-piece body halves with a first body segment 58 and a second body segment 60 that are bolted together in assembly, though the nozzle 28 could be made of a single one-piece construction in other embodiments. For the flow and movement of molten lead through its body, the nozzle 28 has a first passage 62 and a second passage 64 in this embodiment; still, in other embodiments the nozzle could have other quantities of passages such as a single passage. The exact quantity of passages and their design can be dictated by the desired thickness of the continuous lead strip departing the first and second rollers 30, 32, and the desired flow rate of molten lead passing through the lead strip caster 10. For instance, in this embodiment, it was found through computational fluid analysis and experimentation that a pair passages promoted and facilitated improved molten lead fluid flow behavior compared to a single passage. Without wishing to be confined to a particular theory of causation, it is believed that the greater reduction in thickness observed in the single passage tended to cause an undesirable degree of irregular molten fluid flow behavior, or turbulence, within the single passage, which consequently hindered the flow of molten lead therethrough.

The first passage 62 is defined by inside surfaces of the nozzle's body and extends through the body from a first entrance 66 to a first exit 68. Likewise, the second passage 64 is defined by inside surfaces of the nozzle's body and extends through the body from a second entrance 70 to a second exit 72. The first and second passages 62, 64 extend transversely across the nozzle 28 between a first side wall 74 and a second side wall 76, and short of the overall transverse length of the nozzle 28—the transverse length of the passages 62, 64 equates to the width of the produced continuous lead strip. The first and second entrances 66, 70 reside at an entrance end 78 of the nozzle 28 that can be mounted with the ladle 26 adjacent the outlet 56 so that the first and second entrances 66, 70 fluidly communicate with the outlet 56 and receive molten lead therefrom. The first and second entrances 66, 70 can have slot-like shapes to match the shape of the outlet 56. Still, in other embodiments the first and second passages 62, 64 can share a common entrance in the nozzle 28 that branches off downstream into separate passages. At the first exit 68, the first passage 62 terminates openly to a first working surface 80 (subsequently described) and delivers molten lead thereto. Similarly, at the second exit 72, the second passage 64 terminates openly to a second working surface 82 (subsequently described) and delivers molten lead thereto. In other embodiments not depicted in the figures, the first and second exits 68, 72 need not necessarily terminate directly and immediately at the respective first and second working surfaces 80, 82, and instead could terminate openly to other locations of the nozzle such as at a location upstream of the respective working surface.

With the exception of the site of flow straighteners (subsequently described) in some embodiments, the first and second passages 62, 64 can possess a uniform and constant size and dimension from their entrances 66, 70 and to their exits 68, 72. Further, the first and second passages 62, 64 can have the same size and dimension relative to each other. The first and second passages 62, 64 can be designed to follow a route through the nozzle 28 that promotes and facilitates laminar fluid flow therethrough, and subdues turbulent fluid flow. For example, and referring particularly to FIGS. 7 and 9, in this embodiment the first and second passages 62, 64 have routes that mirror each other and initially exhibit a first linear and parallel section C, then exhibit a divergent section D, and lastly exhibit a second linear and parallel section E. The first linear and parallel section C begins at the entrances 66, 70 and spans straight therefrom with the first and second passages 62, 64 remaining parallel with each other until the divergent section D. At the divergent section D, the first and second passages 62, 64 take a sweeping and curved route, and deviate outboard away from each other. And at the second linear and parallel section E, the first and second passages 62, 64 span straight to the exits 68, 72 and remain parallel with each other throughout. Still, in other embodiments the first and second passages 62, 64 could follow routes different than those presented here, and still effectuate suitable fluid flow.

Figure 11:
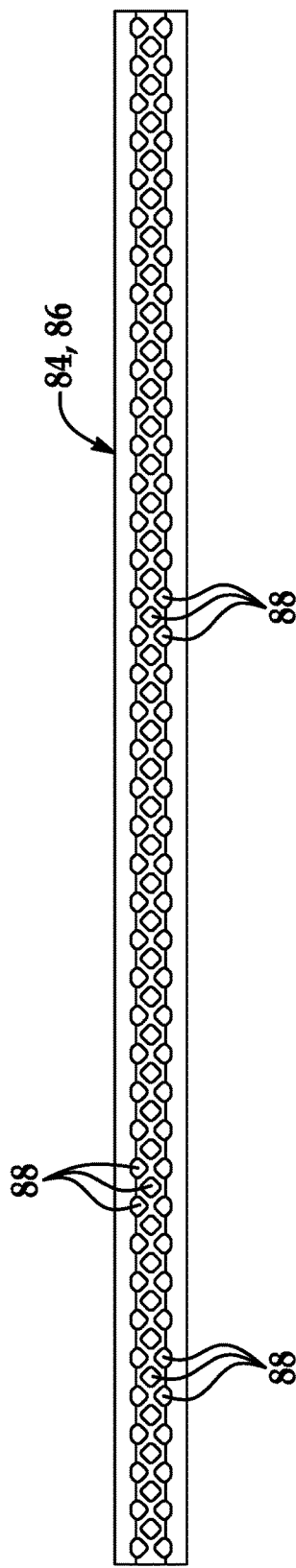
FIG. 11 is front view of an embodiment of a flow straightener of the nozzle.

As mentioned, in some embodiments the nozzle 28 may include flow straighteners to promote and facilitate laminar fluid flow through the nozzle 28 and subdue turbulent fluid flow. The flow straighteners can have various designs, constructions, quantities, and locations in different embodiments. In the embodiment presented in FIGS. 7-9 and FIG. 11, a first flow straightener 84 is disposed in the first passage 62, and a second flow straightener 86 is disposed in the second passage 64. To accept the flow and movement of molten lead therethrough, the first flow straightener 84 is located downstream of the first entrance 66 and upstream of the first exit 68, and at the second linear and parallel section E; other locations are possible. The first flow straightener 84 spans across the full transverse length of the first passage 62. At its location, the first passage 62 can have an increased size and dimension compared to its remaining extent in order to accommodate placement of the first flow straightener 84. Likewise, to accept the flow and movement of molten lead therethrough, the second flow straightener 86 is located downstream of the second entrance 70 and upstream of the second exit 72, and at the second linear and parallel section E; other locations are possible. The second flow straightener 86 spans across the full transverse length of the second passage 64. At its location, the second passage 64 can have an increased size and dimension compared to its remaining extent in order to accommodate placement of the second flow straightener 86. The first and second flow straightener 84, 86 can be of different types. Referring particularly to FIG. 11, in this example the flow straighteners 84, 86 are of the honeycomb type with multiple ducts 88 through which molten lead flows.

To manage the temperature of molten lead flowing and moving through the nozzle 28 as the molten lead makes its way from entrance to exit, in some embodiments the nozzle 28 may include heaters. The heaters can have various designs, constructions, quantities, and locations in different embodiments. In the embodiment presented in FIGS. 6-9, a total of eight heaters 90 are carried internally in the nozzle's body. The heaters 90 can be positioned relative to the first and second passages 62, 64 in order to generate more heat in the nozzle's body and to the molten lead more immediately downstream of the entrances 66, 70, as compared to the heat generated more immediately upstream of the exits 68, 72. The molten lead can hence experience a gradual reduction in temperature from its entrance in the passages 62, 64 to its travel to the exits 68, 72. The heaters 90 can be of different types. In one example the heaters 90 can be cartridge-type heaters. Furthermore, it has been found that having the pair of passages 62, 64 in some cases can aid the temperature management capabilities and effectiveness of molten lead compared to a single passage; the pair of passages presents reduced volumes and amounts of molten lead than a single passage, making it easier to impart heat thereto as desired.

Figure 6:
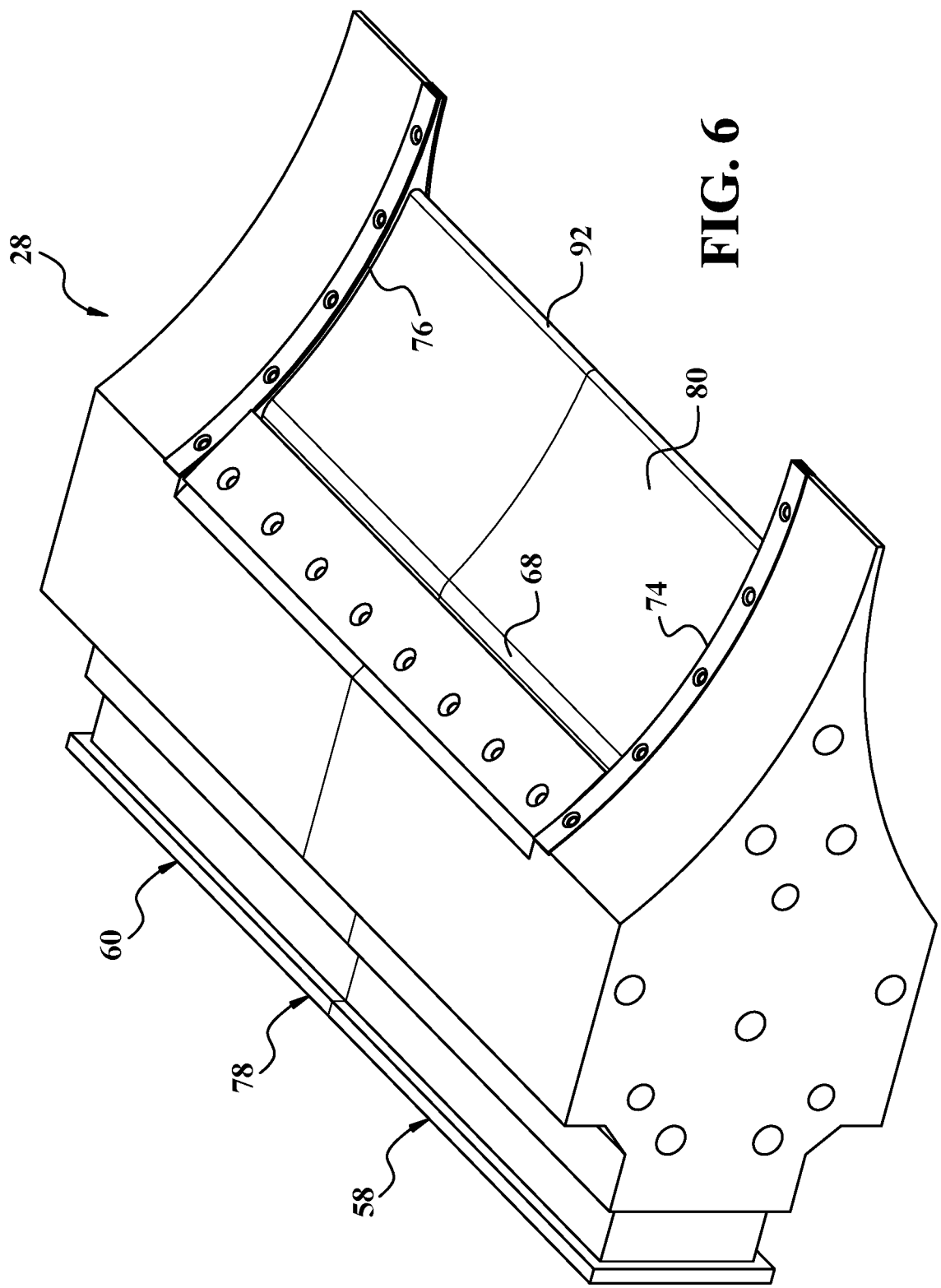
FIG. 6 is a perspective view of an embodiment of a nozzle of the lead strip caster.
Figure 7:
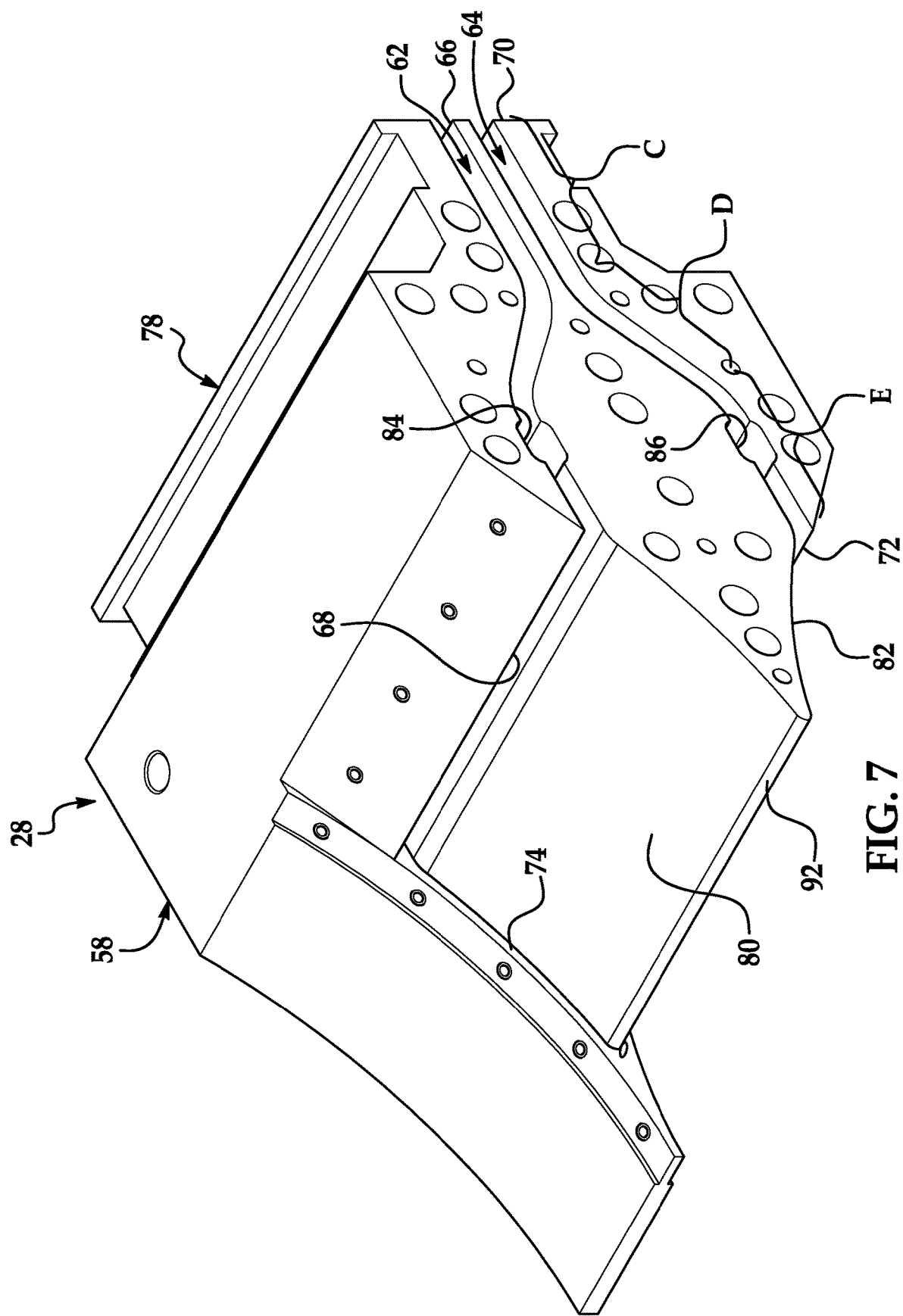
FIG. 7 is a perspective view of a one-half segment of the nozzle.
Figure 8:
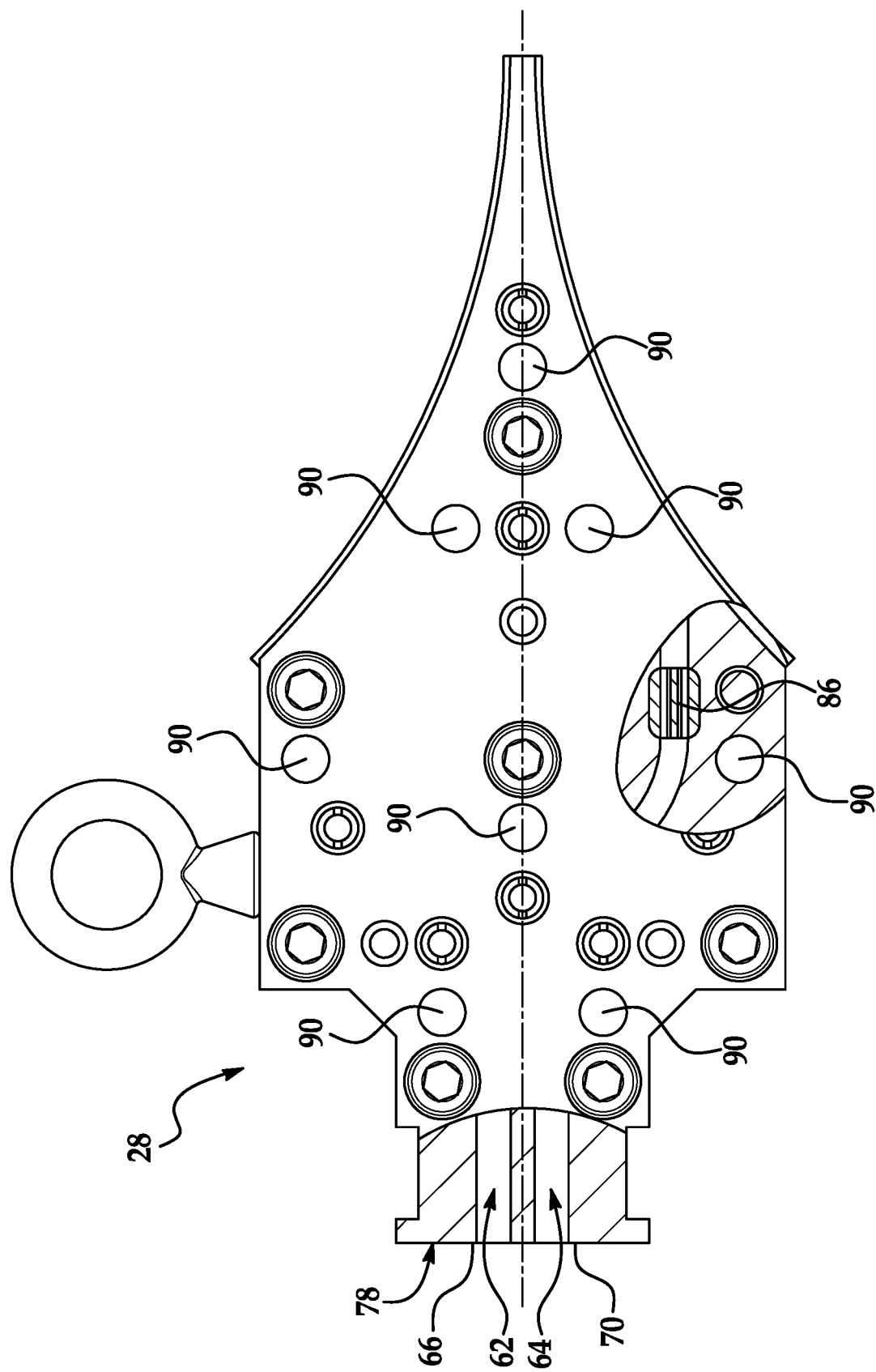
FIG. 8 is a side view of the nozzle.
Figure 9:
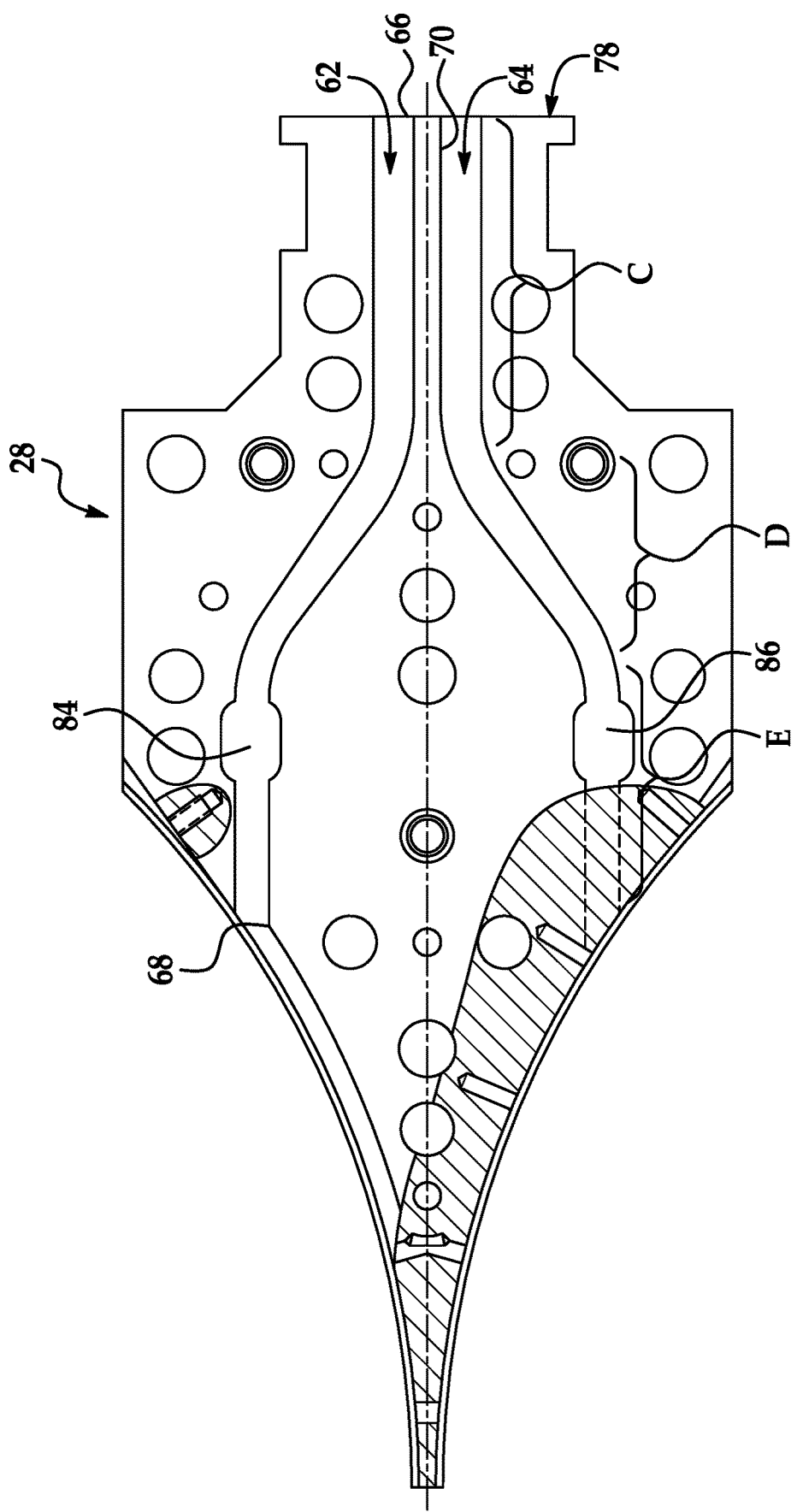
FIG. 9 is a sectional view of the nozzle.
Figure 10:
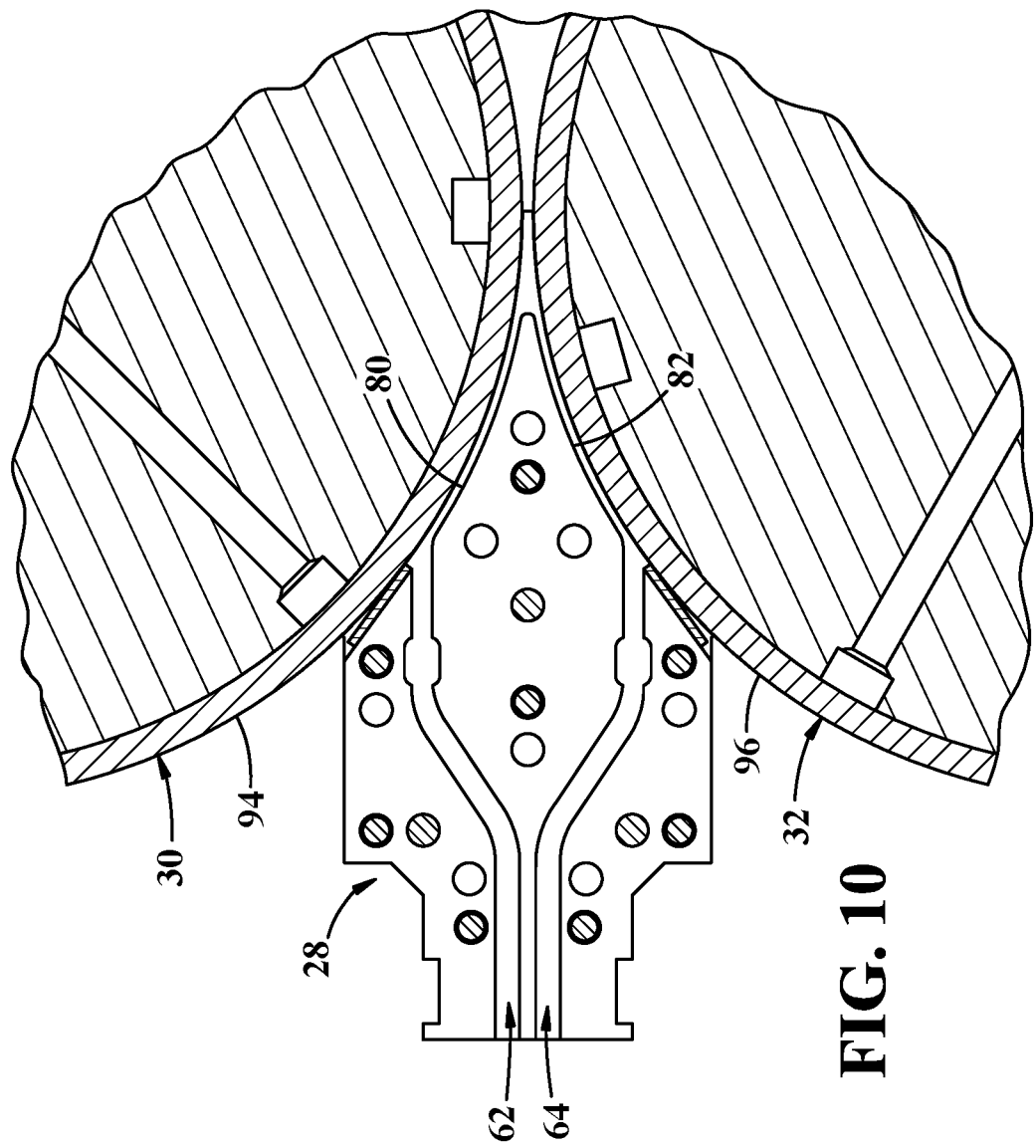
FIG. 10 is a sectional and partial view of the nozzle and of embodiments of a pair of rollers of the lead strip caster.

Referring now particularly to FIGS. 6 and 7, at the exterior of the nozzle 28 and downstream of the passage exits 68, 72, the nozzle 28 has the first working surface 80 and the second working surface 82. During use of the lead strip caster 10, the first working surface 80 receives delivery of molten lead from the first passage 62 at the first exit 68, and the second working surface 82 receives delivery of molten lead from the second passage 64 at the second exit 72. The molten lead flows and moves downstream of the first and second exits 68, 72 and along the first and second working surfaces 80, 82 and to an egress end 92, where the two streams of molten lead merge together and unite between the first and second rollers 30, 32. In this embodiment, the first and second working surfaces 80, 82 resemble concave depressions defined by arcuately-shaped surfaces. The working surfaces 80, 82 are shaped complementary to outer surfaces of the roller 30, 32 so that the first roller 30 can nest in the first working surface 80 with a clearance maintained therebetween to accept delivery of molten lead, and so that the second roller 32 can nest in the second working surface 82 with a clearance maintained therebetween to accept delivery of molten lead. One example of the nesting between the rollers 30, 32 and the working surfaces 80, 82 of the nozzle 28 is illustrated in FIG. 10. Similar to the passages 62, 64, the working surfaces 80, 82 span transversely across the nozzle 28 between the first and second side walls 74, 76, where the side walls 74, 76 serve to enclose the transverse extent of the molten lead thereat. Following their arcuate shape, the working surfaces 80, 82 span from respective exits 68, 72 to the egress end 92, and therealong the working surfaces 80, 82 confront the respective outer surfaces of the rollers 30, 32 across the respective clearances. The extent of the confrontation and the extent of the maintained clearances provides an expansive scope of contact between the molten lead and rollers 30, 32 compared to previously-known casting machines. The molten lead is hence more progressively cooled and hardened as it moves from the exits 68, 72 and to the egress end 92 and downstream thereof.

The nozzle 28 is designed and constructed as a separate and modular unit in the lead strip caster 10 that can be readily assembled and disassembled in the lead strip caster 10. In this way, the lead strip caster 10 can be equipped with an interchangeable nozzle component. Different nozzles of different designs and constructions can be exchanged in the lead strip caster 10 to produce continuous lead strips of various widths and thicknesses, as desired. For instance, the width of the produced continuous lead strip can vary among different nozzle designs and constructions with different transverse lengths between the first and second side walls 74, 76. In addition, the thickness of the produced continuous lead strip can vary among different nozzle designs and constructions via one or more of the following measures: adjustment of the sizes and dimensions of the passages 62, 64; adjustment of the sizes and dimensions of the clearances between the working surfaces 80, 82 and outer surfaces of the rollers 30, 32; displacement of the forward and rearward location of the egress end 92; and/or adjustment of clearance between the outer surfaces of the rollers 30, 32.

Figure 12:
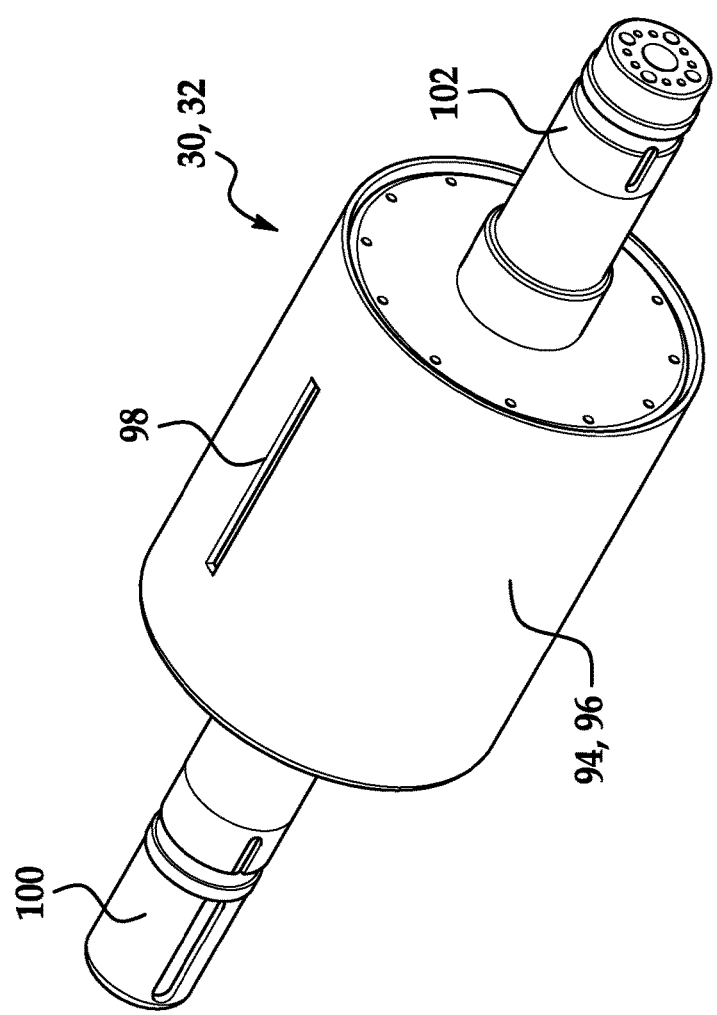
FIG. 12 is a perspective view of an embodiment of a roller of the lead strip caster.
Figure 13:
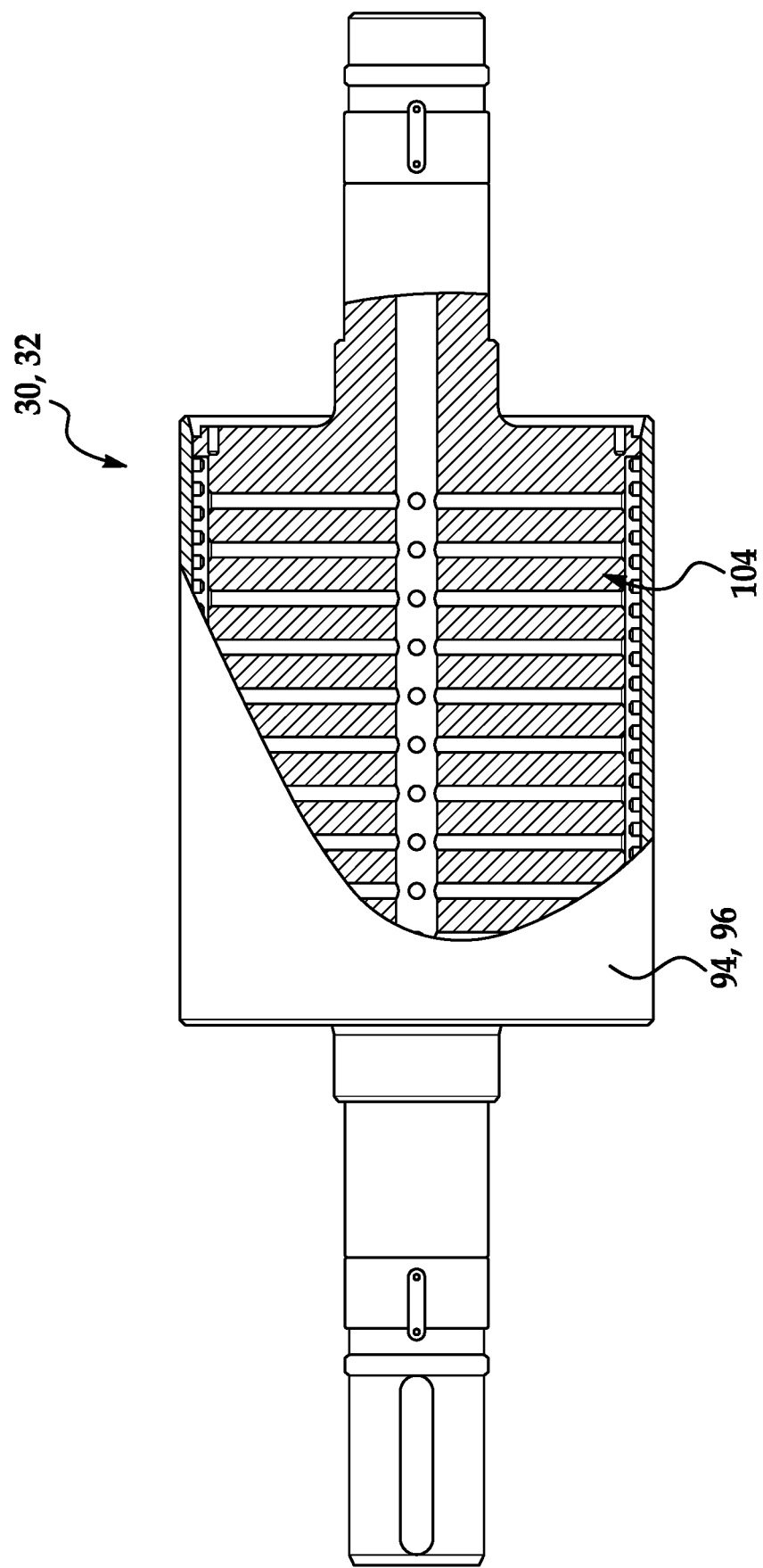
FIG. 13 is a partially sectional view of the roller.

Together with the nozzle 28, the first and second rollers 30, 32 work to bring the molten lead from its molten state to a hardened state ready for further processing by the rolling mills 16. Referring generally to FIGS. 12 and 13, as described, when assembled in the lead strip caster 10 the first roller 30 is situated at a first exterior side of the nozzle 28 where an arcuate section of a first outer surface 94 confronts the first working surface 80, and the second roller 32 is situated at a second exterior side of the nozzle 28 where an arcuate section of a second outer surface 96 confronts the second working surface 82. The first and second rollers 30, 32 can have various designs and constructions in different embodiments. As depicted in FIG. 12, in this embodiment the rollers 30, 32 may have one or more grooves 98 at their outer surfaces 94, 96 in order to augment traction established between the molten and hardened lead and the rollers 30, 32. At their axially outboard ends, the rollers 30, 32 have first and second axles 100, 102 for coupling to the respective first and second drivers 34, 36 and permitting rotation thereabout. The first and second drivers 34, 36 can be motors that drive continuous rotation of the respective first and second rollers 30, 32 amid operation of the lead strip caster 10. Lastly, and as partially depicted in the sectioned view of FIG. 13, the rollers 30, 32 can be equipped with a thermal construction 104 that circulates thermal fluid to manage and control the temperature of the outer surfaces 94, 96, as desired. In FIG. 13, thermal fluid circulates through circulation veins that are represented and illustrated in the figure as vertical bars that lack sectional pattern lines. In one embodiment, the thermal construction 104 recirculates thermal fluid in the form of coolant, such as water, through internal chambers defined within the rollers 30, 32. The outer surfaces 94, 96 are thereby cooled. In another embodiment, the thermal construction 104 recirculates heated thermal fluid through the internal chambers. The outer surfaces 94, 96 are thereby heated. During use of the lead strip caster 10, the streams of molten lead leaving the exits 68, 72 come into direct contact with the respective cooled or heated outer surfaces 94, 96 as the rollers 30, 32 rotate. The streams of molten lead maintain that contact until after the streams merge and unite together downstream of the egress end 92. The contact with the outer surfaces 94, 96 serves to control the temperature of the molten lead, as desired, such as progressively cooling it into a hardened state. In this way, the rollers 30, 32 and their thermal constructions 104 can serve to help control the temperature of the molten lead.

As described, the lead strip caster 10 is designed and constructed to exhibit a horizontal orientation. In other words, the ladle 26 and nozzle 28 are configured generally side-by-side relative to each other whereby molten lead flows and moves along a general horizontal and lateral course from the ladle's inlet 54 and ultimately to the nozzle's egress end 92. While the flow and movement of the molten lead may have localized departures from a strictly horizontal and lateral course—such as when the molten lead passes over the partition wall 48 along the path B—the general flow and movement is still principally horizontal and lateral, especially when contrasted with conventional casting machines that have a vertical configuration. In the vertical configurations, molten lead is fed vertically downward from an upwardly-located ladle to a downwardly-located set of rollers. Impurities and dross residing at top surfaces of molten lead pools in the ladles of vertical configurations can make their way to the sets of rollers, which causes deformations and defects in the produced lead strip and ultimately in the grids. The horizontal orientation of the lead strip caster 10 and the nozzle 28 resolves these issues. Any impurities and dross residing at the top surface of the pool A remain thereat and are precluded from making their way to the nozzle 28 and, therefore, to the produced continuous lead strip. The ladle's outlet 56 is located at the bottom section of the ladle 26 and is directed horizontally and laterally to the nozzle 28, as perhaps demonstrated best in FIG. 5. This location and direction frustrates, if not altogether precludes, the migration of head impurities and dross to the nozzle 28. Furthermore, the flow and movement of molten lead through the nozzle 28 shields and safeguards the molten lead from the atmosphere, hence averting dross formation at the nozzle 28.

While depicted and described for utilization in a horizontal orientation and configuration, the nozzle 28 could be equipped in a lead strip caster exhibiting a vertical configuration. Moreover, whether in a horizontal or vertical configuration, the nozzle 28 could be employed in a lead strip caster that need not necessarily include a ladle, and instead could receive molten lead from other types of molten lead delivery devices and systems that lack ladles such as molten lead feed-lines.

While the forms of the invention herein disclosed constitute exemplary forms and embodiments, many others are possible. It is not intended herein to mention all the possible equivalent forms or ramifications of the invention. The terms used herein are merely descriptive, rather than limiting, and various changes may be made without departing from the spirit or scope of the invention.

The invention claimed is:

1. A lead strip caster for battery plate grids, the caster comprising:
   a nozzle having a first passage for flow of molten lead and having a second passage for flow of molten lead, and the nozzle having a first exterior working surface, a second exterior working surface and an egress end downstream of the first and second passages;
   a first roller having a first outer surface that confronts the first exterior working surface;
   a second roller having a second outer surface that confronts the second exterior working surface;

a ladle having an inlet to receive molten lead and an outlet configured to supply molten lead to the first and second passages of the nozzle; and from the outlet of the ladle and downstream to exiting the passages of the nozzle, molten lead flows along a lateral course;

wherein, during use of the lead strip caster, molten lead exiting the first passage of the nozzle is delivered to the first exterior working surface and comes into contact with the first outer surface of the first roller, molten lead exiting the second passage of the nozzle is delivered to the second exterior working surface and comes into contact with the second outer surface of the second roller, and the molten lead delivered by the first passage and the molten lead delivered by the second passage merge together downstream of the egress end of the nozzle.

2. A lead strip caster for battery plate grids, the caster comprising:

a nozzle having a first passage for flow of molten lead and having a second passage for flow of molten lead, and the nozzle having a first exterior working surface, a second exterior working surface and an egress end downstream of the first and second passages;

a first roller having a first outer surface that confronts the first exterior working surface;

a second roller having a second outer surface that confronts the second exterior working surface;

a ladle having an inlet to receive molten lead and an outlet configured to supply molten lead to the first and second passages of the nozzle; and the ladle outlet of the ladle and the nozzle exhibit a horizontal orientation relative to each other; wherein, during use of the lead strip caster, molten lead exiting the first passage of the nozzle is delivered to the first exterior working surface and comes into contact with the first outer surface of the first roller, molten lead exiting the second passage of the nozzle is delivered to the second exterior working surface and comes into contact with the second outer surface of the second roller, and the molten lead delivered by the first passage and the molten lead delivered by the second passage merge together downstream of the egress end of the nozzle.

3. The lead strip caster of claim 2, wherein the inlet of the ladle is located at a bottom section of the ladle, and the outlet of the ladle is located at the bottom section of the ladle.

4. The lead strip caster of claim 2, wherein the ladle includes a partition wall at an interior of the ladle that divides the interior into a first interior compartment and a second interior compartment, the inlet of the ladle feeding molten lead to the first interior compartment and the outlet of the ladle receiving molten lead at the second interior compartment.

5. The lead strip caster of claim 2, wherein the nozzle includes a plurality of heaters carried by the nozzle to generate heat within the nozzle.

6. The lead strip caster of claim 2, wherein at least one of the first roller or second roller is equipped with a thermal construction in which thermal fluid circulates therein in order to cool or heat the respective outer surface(s) of the first roller, of the second roller, or of both the first and second rollers.

7. The lead strip caster of claim 2, wherein the first passage and second passage are routed through the nozzle and exhibit a mirror image with respect to each other, the first passage having at least one linear section along its extent, and the second passage having at least one linear section along its extent.

8. The lead strip caster of claim 2, wherein the first exterior working surface has an arcuate profile, the second exterior working surface has an arcuate profile, and molten lead delivered to the first exterior working surface and molten lead delivered to the second exterior working surface merge together downstream of the egress end of the lead strip caster nozzle.

9. The lead strip caster of claim 2, further comprising a first flow straightener disposed in the first passage to receive molten lead moving through the first passage, and a second flow straightener disposed in the second passage to receive molten lead moving through the second passage.

10. The lead strip caster of claim 2, wherein the first and second exterior working surfaces are generally arcuately-shaped, the first outer surface of the first roller is shaped complementary to the first exterior working surface and nests therewith with a clearance maintained therebetween to accept delivery of molten lead, and the second outer surface of the second roller is shaped complementary to the second exterior working surface and nests therewith with a clearance maintained therebetween to accept delivery of molten lead.

11. The lead strip caster of claim 2, wherein a first exit of the first passage delivers molten lead between the first exterior working surface of the nozzle and the first outer surface of the first roller, and a second exit of the second passage delivers molten lead between the second exterior working surface of the nozzle and the second outer surface of the second roller.

12. The lead strip caster of claim 11, wherein molten lead delivered via the first exit of the first passage moves downstream of the first exit toward the egress end of the nozzle, molten lead delivered via the second exit of the second passage moves downstream of the second exit toward the egress end of the nozzle, and the molten lead delivered via the first exit and the molten lead delivered via the second exit merge together downstream of the egress end and between the first outer surface of the first roller and the second outer surface of the second roller.

13. The lead strip caster of claim 12, wherein the nozzle includes a plurality of heaters carried by the nozzle to generate heat within the nozzle.

14. The lead strip caster of claim 12, wherein at least one of the first roller or second roller is equipped with a thermal construction in which thermal fluid circulates therein in order to cool or heat the respective outer surface(s) of the first roller, of the second roller, or of both the first and second rollers.

15. The lead strip caster of claim 14, further comprising a plurality of heaters carried by the lead strip caster nozzle to generate heat within the lead strip caster nozzle.

16. The lead strip caster of claim 11, wherein the first and second exterior working surfaces are arcuately-shaped, the first outer surface of the first roller is shaped complementary to the first exterior working surface and nests therewith with a clearance maintained therebetween to accept delivery of molten lead, and the second outer surface of the second roller is shaped complementary to the second exterior working surface and nests therewith with a clearance maintained therebetween to accept delivery of molten lead.

17. A lead strip caster for battery plate grids, the caster comprising:

a first roller having a first cylindrical outer surface;

a second roller having a second cylindrical outer surface and the first and second outer surfaces providing a nip between them;

a nozzle having a first arcuate exterior surface complimentary to, spaced from and confronting a portion of the first cylindrical outer surface and extending upstream of the nip, a first passage with a first exit opening to the first arcuate exterior surface upstream of a downstream egress end thereof and to a confronting portion of the first cylindrical outer surface upstream of the nip, and a first section of the first passage opening to the first exit and extending upstream of the first exit for flow of molten lead through the first passage and first exit and into a space between the first arcuate exterior surface and a confronting portion of the first cylindrical outer surface downstream of the first exit and to the egress end; and the nozzle having a second arcuate exterior surface complimentary to, spaced from and confronting a portion of the second cylindrical outer and extending upstream of the nip, a second passage with a second exit opening to the second arcuate exterior surface upstream of a downstream egress end thereof and to a confronting portion of the second cylindrical outer surface upstream of the nip, and a second section of the second passage opening to the second exit and extending upstream of the second exit for flow of molten lead through the second passage and the second exit and into a space between the second arcuate exterior surface and a confronting portion of the second cylindrical outer surface downstream of the second exit and to the egress end; and wherein, during use of the lead strip caster, molten lead exiting the first passage of the nozzle is delivered to the first exterior working surface and comes into contact with a portion of the first cylindrical outer surface of the first roller, molten lead exiting the second passage of the nozzle is delivered to the second exterior working surface and comes into contact with a portion of the second cylindrical outer surface of the second roller, and the molten lead delivered by the first passage and the molten lead delivered by the second passage merge together only at or downstream of the egress ends.

18. The lead strip caster of claim 17, wherein at least the first section of the first passage and at least the second section of the second passage have a horizontal orientation.

19. The lead strip caster of claim 17 wherein molten lead delivered via the first exit of the first passage moves downstream of the first exit to the egress end of the nozzle, molten lead delivered via the second exit of the second passage moves downstream of the second exit to the egress end of the nozzle, and the molten lead delivered via the first exit and the molten lead delivered via the second exit merge together only at or downstream of the egress end and between the first cylindrical outer surface of the first roller and the second cylindrical outer surface of the second roller.

20. The lead strip caster of claim 17, wherein at least one of the first roller or second roller is equipped with a thermal construction in which thermal fluid circulates therein in order to cool or heat the cylindrical outer surface of the first roller or of the second roller, or of both the first and second rollers.

* * * * *